United States Patent
Wang et al.

(10) Patent No.: US 9,926,856 B2
(45) Date of Patent: Mar. 27, 2018

(54) COOPERATIVE CAM PHASER AND AIR THROTTLE CONTROL

(71) Applicant: Cummins Inc., Columbus, IN (US)

(72) Inventors: Jing Wang, Canton, MI (US); Richard A. Booth, Columbus, IN (US); Phanindra Garimella, Bloomington, IN (US)

(73) Assignee: Cummins Inc., Columbus, IN (US)

( * ) Notice: Subject to any disclaimer, the term of this patent is extended or adjusted under 35 U.S.C. 154(b) by 82 days.

(21) Appl. No.: 14/826,969

(22) Filed: Aug. 14, 2015

(65) Prior Publication Data
US 2017/0044999 A1 Feb. 16, 2017

(51) Int. Cl.
| | |
|---|---|
| *F01L 1/34* | (2006.01) |
| *F02D 9/02* | (2006.01) |
| *F02D 13/02* | (2006.01) |
| *F02D 41/00* | (2006.01) |
| F02D 41/14 | (2006.01) |

(52) U.S. Cl.
CPC ........... *F02D 9/02* (2013.01); *F02D 13/0238* (2013.01); *F02D 41/0002* (2013.01); *F02D 13/0219* (2013.01); *F02D 2009/023* (2013.01); *F02D 2041/001* (2013.01); *F02D 2041/002* (2013.01); *F02D 2041/1412* (2013.01); *F02D 2200/101* (2013.01); *Y02T 10/18* (2013.01); *Y02T 10/42* (2013.01)

(58) Field of Classification Search
CPC ............ F02D 13/0219; F02D 13/0238; F02D 2041/001; F02D 2250/18; F02D 41/006; F02D 41/1401; F02D 2009/023; F02D 9/02

USPC ........................................................ 123/348
See application file for complete search history.

(56) References Cited

U.S. PATENT DOCUMENTS

| | | | |
|---|---|---|---|
| 6,062,026 A | 5/2000 | Woollenweber | |
| 6,311,493 B1 | 11/2001 | Kurihara | |
| 6,615,129 B2 | 9/2003 | Kabasin | |
| 6,728,625 B2 * | 4/2004 | Strubhar ................. | F02D 29/06 123/480 |
| 7,000,393 B1 | 2/2006 | Wood | |
| 7,305,950 B1 | 12/2007 | Sinnamon | |
| 7,380,447 B2 | 6/2008 | Rollinger et al. | |

(Continued)

FOREIGN PATENT DOCUMENTS

| | | |
|---|---|---|
| EP | 2489851 | 8/2012 |
| GB | 1299784 | 12/1972 |

*Primary Examiner* — Hai Huynh
*Assistant Examiner* — Gonzalo Laguarda
(74) *Attorney, Agent, or Firm* — Faegre Baker Daniels LLP

(57) ABSTRACT

Methods and apparatus relate to air handling for an internal combustion engine system, particularly utilizing premixed air and fuel. The engine system includes an intake air throttle (IAT) having a position set in response to the engine speed and a variable valve timing module having an intake valve timing set in response to the engine load. The variable valve timing module may be a cam phaser having a position at or between full retard and full advance positions. The engine system may operate in a transient mode or a fuel efficiency mode. The IAT position is adjusted in response to an engine speed error value or set at full throttle. The cam phaser position is adjusted in response to a pressure difference across the IAT, the engine speed, or is set to a limit position.

13 Claims, 9 Drawing Sheets

(56) References Cited

U.S. PATENT DOCUMENTS

| | | |
|---|---|---|
| 7,426,831 B2 | 9/2008 | Grissom |
| 7,584,044 B2 | 9/2009 | Mladenovic et al. |
| 8,006,658 B2 | 8/2011 | Nakamura et al. |
| 8,028,525 B2 | 10/2011 | An |
| 8,036,806 B2 | 10/2011 | Nakamura |
| 8,276,378 B2 | 10/2012 | Song |
| 8,301,357 B2 | 10/2012 | Murai et al. |
| 8,307,649 B2 | 11/2012 | Axelsson |
| 8,364,381 B2 | 1/2013 | Kar et al. |
| 8,365,528 B2 | 2/2013 | Leone et al. |
| 8,744,716 B2 * | 6/2014 | Kar ............... F02D 11/105 701/110 |
| 8,747,716 B2 | 6/2014 | Morgan et al. |
| 2002/0029757 A1 * | 3/2002 | Ogawa ............ F01L 1/34 123/295 |
| 2008/0092834 A1 * | 4/2008 | Stein ............. F01L 13/0036 123/90.15 |
| 2008/0202469 A1 * | 8/2008 | Kang ............. F02M 26/01 123/435 |
| 2010/0180590 A1 | 7/2010 | Andreae |
| 2013/0066535 A1 | 3/2013 | Leone et al. |
| 2013/0104843 A1 | 5/2013 | Crombe et al. |
| 2014/0067228 A1 | 3/2014 | Polkus |
| 2016/0102636 A1 * | 4/2016 | Styles ............ F02D 41/006 123/568.21 |

* cited by examiner

COOPERATIVE CAM PHASER AND AIR THROTTLE CONTROL

TECHNICAL FIELD

This disclosure generally relates to the control of an internal combustion engine system. More specifically, this disclosure relates to the cooperative control of an intake valve timing and an air throttle in an internal combustion engine.

BACKGROUND

Internal combustion engine systems are often required to meet various performance goals, including engine speed, power production, efficiency, and regulatory requirements. For example, achieving a target engine speed is important in utility power generation applications for synchronization with the electrical grid. To achieve these performance goals, it is often desirable to control the contents of an engine cylinder during combustion, including the amount of air and its related characteristics (e.g., temperature and pressure). Among the techniques to control the airflow into one or more engine cylinders, internal combustion engine systems often include an intake throttle and a cam. The intake throttle is often adjustable for providing a desired flow of air from the ambient environment to an intake manifold. Air is delivered from the intake manifold to an engine cylinder through an intake valve, the opening and closing of which may be controlled by the cam. The flow of air to the engine cylinder can be adjusted with the presence of a cam phaser, which is one technique of variable valve control or timing, to change the phase of the cam (e.g., timing of valve opening and closing, which affects the amount of air that flows into the engine cylinder) and thus to provide a desired amount of air to the engine cylinder. As the operating conditions of the engine change, the desired amount of airflow may change in order to reach the various performance goals required.

SUMMARY

Aspects of various embodiments relate to a method of air handling for an engine system during stoichiometric combustion. An engine speed and an engine load of the engine system are determined. The engine load is one of an actual engine load and a predicted engine load. An intake air throttle (IAT) position is set in response to the engine speed. An intake valve timing is set in response to the engine load. Setting the intake valve timing may include setting at least one of a cam phaser position and an intake valve open duration.

An engine operating mode for the engine system may be determined in response to the engine load, wherein the engine operating mode is one of a transient mode and a fuel efficiency mode. A transient mode may be determined in response to a partial engine load, wherein the intake valve timing is set to improve transient response time. In the transient mode, the IAT position may be set in response to an engine speed error value and/or an engine load to maintain a target engine speed.

A fuel efficiency mode may be determined in response to a higher engine load than the partial engine load range. In the fuel efficiency mode, the IAT position may be set in response to an engine speed, the engine load, and/or the engine speed error value to maintain a target engine speed. The intake valve timing may be set in response to the engine load, a pressure difference across the IAT, an effective compression ratio (ECR), and/or a pressure difference error value across the IAT.

In addition or alternatively, in a fuel efficiency mode, the IAT position may be set to a full throttle position, and the intake valve timing may be set in response to the engine speed and/or an engine speed error value to maintain a target engine speed.

Some embodiments relate to an engine controller comprising a hardware description module (HDM), an air handling determination module (AHDM), and a hardware command module (HCM). The HDM provides one or more engine parameters, including an engine speed and an engine load. The engine load is one of an actual engine load and a predicted engine load. The AHDM provides an IAT position in response to the engine speed and provides an intake valve timing value in response to the engine load. The HCM provides an IAT command in response to the IAT position and an intake valve timing command in response to the intake valve timing value.

Further embodiments relate to an engine system comprising an air handling system and an engine block. The air handling system includes an intake air path, an IAT along the intake path having an IAT position, and a cam phaser along the intake path having a cam phaser position. The engine block includes a set of cylinders in fluid communication with the intake air path. The engine system further comprises means for controlling the IAT position and the cam phaser position to improve transient response time in a transient mode and to improve brake thermal efficiency in a fuel efficiency mode.

While multiple embodiments are disclosed, still other embodiments of the present invention will become apparent to those skilled in the art from the following detailed description, which shows and describes illustrative embodiments of the invention.

Figure 1:
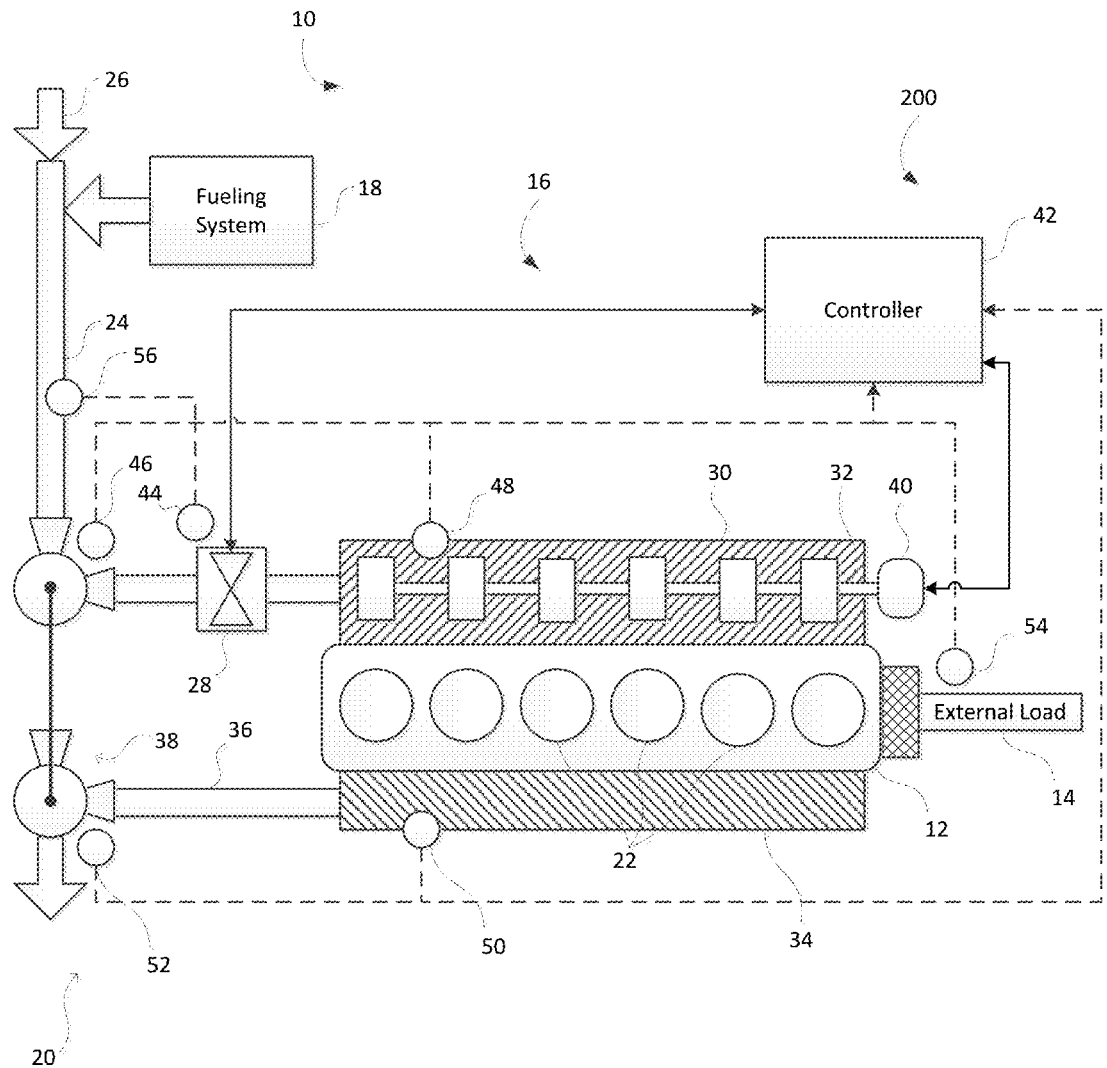
FIG. 1 is a schematic illustration of an engine system including a processing subsystem, according to some embodiments.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, reference is made to the accompanying drawings which form a part hereof and in which are shown, by way of illustration, specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

FIG. 1 is a schematic illustration of an engine system 10, according to some embodiments. As shown, the engine system 10 is configured to operate with premixed air and fuel, such that engine torque is controlled by the mixed air flow. Fuels that may be used with a premixed air and fuel configuration are, for example, natural gas or gasoline. In some embodiments, the engine runs at stoichiometric combustion so that the ratio between air and fuel is stoichiometric (e.g., in a spark-ignition engine utilizing natural gas). In various embodiments, the engine system 10 runs at a non-stoichiometric ratio for combustion (e.g., lean burn).

As illustrated, the engine system 10 includes an engine 12 having an external load 14 coupled to the crankshaft of the engine 12 to apply a load thereto. In some embodiments, the external load 14 is an electrical generator, for example, which may provide power to an electrical grid. In additional embodiments, the external load 14 may be a compressor or a transmission (e.g., in a vehicle application).

Some applications for the engine system 10 will involve applying an external load 14 to the crankshaft of a warmed-up engine system 10. Typically, the load applied at first is a fraction of the rated load, or a partial load. Then, the applied load is increased by the external load 14 over time (e.g., on the order of seconds or minutes) until the rated load is applied. Such increases may be continuous or discrete. This phase of operation may be referred to as "load pickup." The engine system 10 is advantageously configured to improve transient response time, or quickly transition from a lower load to a higher load, during load pickup by operating in a transient mode. Once a high load or the rated load is applied, the engine system 10 often does not need to change engine load quickly (e.g., steady state) and is operating near a nominal engine speed and near a rated engine load. During nominal operation, the engine system 10 is advantageously configured to improve brake thermal efficiency in a fuel efficiency engine operating mode, which allows the engine system to run at relatively lower cost than the transient mode in terms of fuel consumption. The details of the engine system 10 and its operation are described herein in more detail.

In the illustrated embodiment, the example engine system 10 includes an air handling system 16 for providing charge air to the engine 12, a fueling system 18 for providing fuel to the air handling system 16 and/or the engine 12, and an exhaust system 20 for venting exhaust from combustion away from the engine 12. As used throughout this disclosure "charge air" may refer to ambient air, exhaust gas recirculated air, fuel-charged air, or any related variations or combinations thereof.

The example engine 12 includes cylinders 22 for combusting the charge air to provide power for rotating the crankshaft. Generally, the cylinders 22 have a geometric compression ratio that is fixed, particularly during operation of the engine system 10. The geometric compression ratio is the ratio of in-cylinder volume between top dead center (TDC) and bottom dead center (BDC).

Air is delivered to each of the cylinders 22 by the air handling system 16 along an intake air path. In some embodiments, the air handling system 16, includes an intake air line 24 including an intake 26, often with an air cleaner, for receiving a flow of charge air from the ambient environment, an intake air throttle (IAT) 28 for regulating the flow of charge air along the intake air line, an intake manifold 30 to receive the regulated flow of charge air from the intake air line, and a cam drive 32 for regulating the time that the intake valves are open and delivering charge air to the cylinders 22 from the intake manifold. After charge air is combusted in the cylinders 22, exhaust leaves the cylinders through an exhaust path including, for example, an exhaust manifold 34 and an exhaust line 36.

The engine system 10, as shown, further includes an optional turbocharging system 38 coupled to the air handling system 16 and the exhaust system 20. As illustrated, the turbocharging system 38 includes a turbocharger having a compressor in fluid communication with the intake air line 24 to pressurize charge air upstream of the IAT 28 and includes a turbine in fluid communication with the exhaust line 36 downstream of the exhaust manifold 34. In some embodiments, the turbocharging system 38 includes multiple turbochargers to form a multi-stage turbocharging system (e.g., a two-stage turbocharging system with a high-stage stage and a low-stage). In some cases, the turbocharging system 38 is considered part of the air handling system 16 for control purposes.

The example IAT 28 is positioned along the intake air line 24 upstream of the intake manifold 30 to adjust the charge air flow to the intake manifold. In some embodiments, the IAT 28 is a valve, such as a butterfly valve. The IAT 28 is adjustable through a range, for example, between a closed position (e.g., no throttle) and a wide open position (e.g., full throttle) by continuous and/or discrete amounts. For a butterfly valve, the fully open position corresponds to the valve being parallel with the charge airflow through the intake air line 24. In some embodiments, the IAT 28 has a nominal position in response to an engine speed and an engine load, which is determined during calibration and sometimes stored in one or more tables in memory (e.g., engine speed and engine load as inputs, IAT position as output).

In various embodiments, there is a pressure drop or pressure difference (e.g., delta pressure or $\Delta P$) across the IAT 28. The wider or more open the IAT 28 is, the lower the pressure differential is across the IAT. When the IAT 28 at full throttle, for example, the pressure differential may be equal to 0 psi or very low (e.g., 2 or 3 psi). Accordingly, the more closed the IAT 28, the higher the pressure differential is across the IAT.

In some embodiments, the position of the IAT 28 is controlled by mechanical means. The example IAT 28 has a relatively fast response time for the air handling system 16.

In the illustrated embodiment, the cam drive 32 includes a variable valve module 40 to adjust the timing and/or duration that the intake valves are open and/or closed in order to adjust the volumetric efficiency in the cylinders. As the cam lobes rotate, the intake valves and optionally the exhaust valves are opened and closed.

The variable valve module 40 in the form of a cam phaser, for example, opens the valves earlier or later depending on its position. In some embodiments, the variable valve module 40 in the form of a cam phaser forms at least part of a variable valve timing (VVT) system. Although the variable valve module 40 in the form of a cam phaser is discussed herein in more detail, this disclosure recognizes that a variable valve actuation (VVA) system may also be utilized. In other embodiments, the variable valve module 40 is capable of independently shortening or extending the duration the intake valves are open as part of a VVA system.

In some embodiments, the variable valve module 40, which is herein also referred to as cam phaser 40 as a non-limiting example of a variable valve module, is adjustable through a range, for example, between a fully advanced position and a fully retarded position by continuous and/or discrete amounts. The cam phaser 40 may also have a nominal position corresponding to the design of the engine 12, which is between an advance limit and a retard limit. A retard range of the cam phaser 40 is between the retard limit and the nominal position. An advance range of the cam phaser 40 is between the advance limit and the nominal position. In some embodiments, the nominal position of the cam phaser 40 is determined during calibration and sometimes stored in one or more tables in memory (e.g., engine speed and engine load as inputs, cam phaser position as output).

Each position of the cam phaser 40 corresponds to a phase (e.g., timing) that the intake valves are open relative to the crankshaft position or piston position during a combustion cycle. For example, during the intake stroke in a four-stroke combustion cycle (e.g., intake to BDC, compression to TDC, power to BDC, and exhaust to TDC), a nominal position of the cam phaser 40 may correspond to the intake valves opening at TDC (e.g., the beginning of the intake stroke) and closing at BDC (e.g., the end of the intake stroke).

With the nominal position defined in this way, a cam position in the retard range would correspond to the intake valves opening later, such as after TDC (e.g., during the intake stroke) and closing later, such as after BDC (e.g., during the compression stroke). The corresponding full retard position of the cam phaser 40 would open the intake valves at a latest time allowed by the cam phaser (e.g., 20 degrees) during the intake stroke and close the intake valves at a latest time allowed by the cam phaser (e.g., 20 degrees) during the compression stroke to maximize the filling of the engine cylinders from the pressurized intake manifold.

Accordingly, a cam position in the advance range would correspond to the intake valves opening earlier, such as before TDC (e.g., during the exhaust stroke) and closing easlier, such as before BDC (e.g., during the intake stroke). The corresponding full advance position of the cam phaser 40 would open the intake valves at an earliest time allowed by the cam phaser (e.g., 20 degrees) during the exhaust stroke prior to TDC and close at an earliest time allowed by the cam phaser (e.g., 20 degrees) during the intake stroke prior to BDC to minimize the filling of the engine cylinders from the pressurized intake manifold.

In some embodiments, the cam phaser 40 is a gear with an inner portion and an outer portion and is hydraulically adjustable throughout its range. The example cam phaser 40 has a relatively slower response time compared to the response time of the IAT 28. In other embodiments, for example, a VVA system includes a lost motion system, and a longest duration that the valves are open corresponds to the "full retard" position and a shortest duration that the valves are open corresponds to the "full advance" position of the VVT system.

As shown, the engine system 10 includes a controller 42 operatively coupled to one or more other components of the engine system, which performs certain operations to measure parameters and to control the one or more components. Although the controller 42 may be coupled to several components, operative coupling of the controller 42 with the IAT 28 and the cam phaser 40 is shown. The example controller 42 provides one or more commands to adjust characteristics of charge air flow to the cylinders 22.

As illustrated, the controller 42 is coupled to one or more sensors, which may be along the intake air path, the exhaust path, or elsewhere in the engine system 10. Example sensors, as shown, include an IAT pressure sensor 44, a compressor outlet pressure sensor 46, an intake manifold pressure (IMP) sensor 48, an exhaust manifold pressure (EMP) sensor 50, a turbine inlet pressure sensor 52, an engine speed sensor 54, and a mass flow sensor 56 (e.g., at intake or exhaust). However, one or more of these sensors may be excluded in various embodiments of the engine system 10.

The example IAT pressure sensor 44 is a differential pressure sensor providing a relative pressure difference between the charge air flow upstream and downstream of the IAT 28. In other embodiments (not shown), the IAT pressure sensor 44 comprises an upstream absolute pressure sensor and a downstream absolute pressure sensor, and the controller 42 interprets the absolute pressure sensor values to provide a pressure difference. The example compressor outlet pressure sensor 46 and turbine inlet pressure sensor 52 are shown positioned relative to a single turbocharger. In alternative embodiments (not shown) having two turbochargers, the sensors 46, 52 may be placed relative to the high-pressure turbocharger, the low-pressure turbocharger, or a mix thereof. The example mass flow sensor 56 is positioned to measure the charge air flow along the intake air path.

In some embodiments, the controller 42 may be considered to include any of these sensors, in addition to other sensors. While in other embodiments, the controller 42 may exclude one or more of these sensors.

Many aspects of this disclosure are described in terms of sequences of actions to be performed by elements of a driver, controller, module and/or a computer system or other hardware capable of executing programmed instructions. These elements can be embodied in a controller of an engine system, such as an engine control module or unit (ECM or ECU), or in a controller separate from, and communicating with an ECM/ECU. In an embodiment, the controller and/or ECM/ECU can be part of a controller area network (CAN) in which the controller, sensor, and/or actuators communicate via digital CAN messages. It will be recognized that in each of the embodiments, the various actions for implementing the control strategy could be performed by specialized circuits (e.g., discrete logic gates interconnected to perform a specialized function), by program instructions, such as program modules, being executed by one or more processors (e.g., a central processing unit (CPU) or microprocessor), or by a combination of both, all of which can be implemented in a hardware and/or non-transient computer readable instructions of the ECM/ECU and/or other controller or plural controllers. Logic of embodiments consistent with the disclosure can be implemented with any type of appropriate hardware and/or non-transient computer readable instructions, with portions residing in the form of computer readable storage medium with a control algorithm recorded thereon such as the executable logic and instructions disclosed herein, and can be programmed, for example, to include one or more singular or multidimensional lookup tables and/or calibration parameters. The computer readable medium can comprise a random access memory (RAM), a read-only memory (ROM), an erasable programmable read-only memory (EPROM or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

In some applications, when a load is applied, the engine system 10 is tasked with "pushing" against the applied load to provide power at a constant or target engine speed. A certain amount of charge air is required for combustion to maintain the engine speed while "pushing" against the applied load. The example engine system 10 makes beneficial use of both the IAT 28 and the cam phaser 40 to adjust the amount of charge air delivered into the cylinders 22. In particular, the example engine system 10 sets an IAT position and a cam phaser position in response to the engine speed and/or the engine load with command(s) from the controller 42. For some cases, the IAT position and/or cam phaser position are set further in response to a target engine speed and a target engine load.

Engine load may be an actual engine load or a predicted engine load. Actual engine load is determined in response to one or more sensor measurements. For example, the actual engine load may be determined in response to one or more measurements from the compressor outlet pressure sensor 46, the IMP sensor 48, the EMP sensor 50, the turbine inlet pressure sensor 52, and the mass flow sensor 56. However, one or more of these measurements may also be excluded. In some embodiments, the actual engine load is determined in response to an EMP measurement. In various embodiments, the actual engine load is determined in response to a load signal. For example, a load signal may be a kilowatt load signal provided by a generator tasked with being the external load 14.

Accordingly, a predicted engine load relates to an engine load in a forward-looking time horizon. In some embodiments, the predicted engine load includes a predicted torque demand (e.g., reactive) or a desired engine load (e.g., proactive) a few seconds into the future based on one or more engine parameters.

In some embodiments, the example engine system 10 sets an IAT position in response to the engine speed and sets a cam phaser position in response to the engine load with command(s) from the controller 42. The IAT 28 is a faster controller than the cam phaser 40 and is suitable for quickly controlling the engine speed. In some applications, such as electrical generation for a power grid, synchronization of the engine speed with the power grid and thus maintaining a precise engine speed is an important requirement.

On the other hand, the cam phaser 40 is suitable for directly controlling the effective compression ratio (ECR) of the engine 12 or volumetric efficiency. ECR is defined as an intermediate variable, which is calculated from at least EMP and IMP and gives heavier weighting to the EMP. Thus, the ECR is less affected by the position of the IAT 28 than the position of the cam phaser 40.

Furthermore, the cam phaser 40 is optionally adjusted in response to a target pressure differential across the IAT 28. For example, once an IAT 28 position is set, this establishes a pressure differential across the IAT 28, and by setting the cam phaser 40 into a retarded position (e.g., more air to the cylinders), the IAT pressure differential will increase due to reduced pressure in the intake manifold. Similarly, by setting the cam phaser 40 into an advanced position (e.g., less air to the cylinders), the IAT pressure differential will decrease due to elevated pressure in the intake manifold. In general, the higher the pressure differential, the lower the open cycle efficiency of the engine system 10 (e.g. higher pumping loss), and vice versa. On the other hand, the higher the pressure differential, the greater influence the position of the IAT 28 will have on the charge air flow to the cylinders. With this recognition, the cam phaser 40 can be adjusted in cooperation with the IAT 28 to maintain a pressure differential to balance open cycle efficiency and/or pumping loss, and thus brake thermal efficiency, with control of the charge air to the cylinders by the IAT.

In addition, the example engine system 10 changes control mode in response to the operating condition of the engine system 10. For example, the engine system 10 may recognize a partial load condition when the target engine load is in a partial load range, which may range from 0% to less than 100% of the rated load. Non-limiting examples of partial load ranges include 0% to 50%, 20% to 60%, or 0% to 80%. In various embodiments, the partial load range is a range less than a threshold load, such as 50% of the rated load.

In response to the partial load, which may mean the target engine load is changing every few seconds or minutes, the example engine system 10 enters into a transient mode and sets the cam phaser 40 into a full retard position to improve volumetric efficiency and/or ECR, and thus improves the transient response time by allowing the greatest amount of air to be delivered into the cylinders 22 at each engine speed. In some embodiments, the IAT 28 is set into an initial position in response to the target engine speed to control the engine speed with the IAT's relatively quick response time. In various embodiments, the IAT 28 position is further set or adjusted into a feedback position, which is determined in response to comparing the engine speed with the target engine speed (e.g., an engine speed error value).

As used herein, the term "error value" means the result determined in response to the comparison of two values or sets of values. For example, an error value may be the difference between an actual/measured value and a target value. Other types of error calculations and comparisons known to those having skill in the art are also contemplated.

In another example, the engine system 10 may recognize or interpret a high load condition greater than the partial load range up to 100% of the rated load. In response to the high load condition, which may mean the target engine load is changing less rapidly, the example engine system 10 enters into a fuel efficiency mode and sets the IAT 28 into an initial position in response to the target engine speed and the target engine load to control the engine speed. In various embodiments, and similar to transient mode operation, the IAT 28 position is further set or adjusted into a feedback position, which is determined in response to comparing the engine speed with the target engine speed (e.g., an engine speed error value).

Also, in response to the high load condition, the example engine system 10 also sets the cam phaser 40 into an initial position in response to at least one of a target engine load, a target pressure difference across the IAT, and/or a target ECR. In various embodiments, the cam phaser 40 is further set or adjusted in response to a comparing the actual pressure difference across the IAT 28 to the target pressure difference (e.g., pressure difference error value). In some embodiments, the initial position and the feedback position of the cam phaser 40 are advanced relative to a nominal position of the cam phaser.

In a further or alternative embodiment, in response to the high load condition, the engine system 10 enters into an alternative fuel efficiency mode. In the alternative fuel efficiency mode, the IAT 28 is set into a full throttle position and the cam phaser 40 is set into an initial position in response to the target engine speed. Furthermore, the cam phaser 40 may be set into a feedback position in response to an engine speed error value.

In certain embodiments, the controller 42 forms a portion of a processing subsystem 200 (FIG. 2) including one or more computing devices having memory, processing, and communication hardware. The controller 42 and its functionality may be implemented in any known manner. For example, the controller 42 may be a single device or a distributed device, and the functions of the controller may be performed by hardware and/or as computer instructions on a non-transient computer readable storage medium.

In certain embodiments, the controller 42 includes one or more modules that functionally execute the operations of the controller. The description herein includes modules emphasizes the structural independence of certain aspects of the controller 42, and illustrates one grouping of operations and responsibilities of the controller. Other groupings that execute similar overall operations are understood within the scope of this disclosure. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Figure 2:
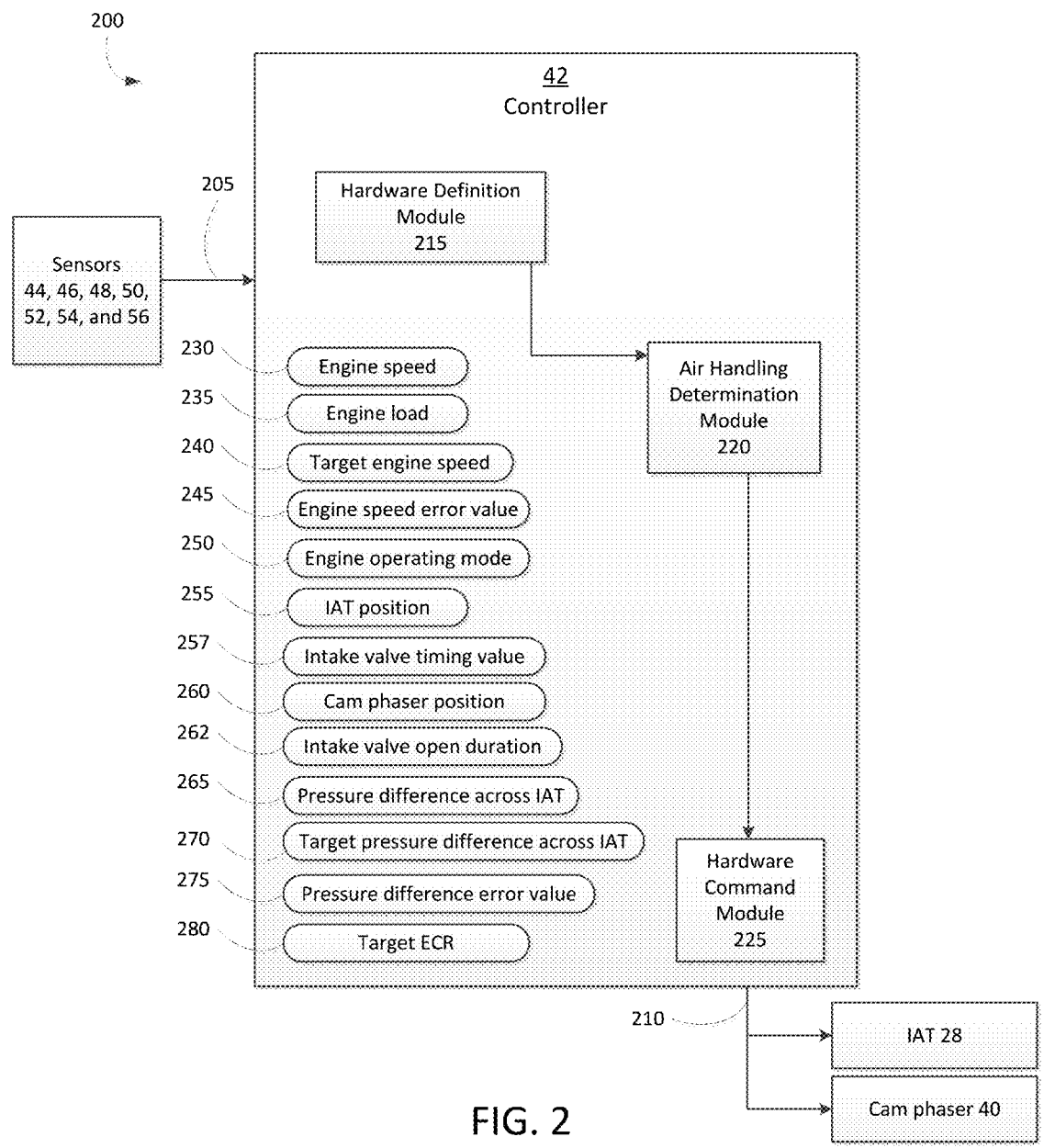
FIG. 2 is a schematic illustration showing the processing subsystem of FIG. 1 including a controller, according to some embodiments.

FIG. 2 is a schematic illustration showing the processing subsystem 200 including controller 42, according to some embodiments. The example processing subsystem 200 includes one or more inputs 205 for providing indications to the example controller 42 and one or more outputs 210 for providing commands from the example controller 42. The input(s) 205 and output(s) 210 are not limited in any particular manner and may be, for example, of a mechanical, electrical, electronic, electromagnetic, and/or optical nature. The one or more inputs 205 may include, for example, an indication from one or more of the sensors 44, 46, 48, 50, 52, 54, and 56 (FIG. 1) as applicable. The one or more outputs 210 may include, for example, a command to the IAT 28 and/or the cam phaser 40, as applicable.

As further illustrated, the controller 42 includes a hardware definition module (HDM) 215, an air handling determination module (AHDM) 220, and a hardware command module (HCM) 225. The example controller 42 also includes one or more parameters related to the engine system, such as an engine speed 230, an engine load 235, a target engine speed 240, an engine speed error value 245, an engine operating mode 250, an IAT position 255, an intake valve timing value 257, a cam phaser position 260, an intake valve open duration 262, a pressure difference across the IAT 265, a target pressure difference across the IAT 270, a pressure difference error value 275 (e.g., across the IAT), and/or a target ECR 280.

The example HDM 215 interprets or determines one or more parameters available to the controller 42 for storage, output, and/or further processing by modules in the controller. For example, the HDM 215 may interpret or determine one or more of the engine speed 230, the engine load 235, the target engine speed 240, the engine speed error value 245, the pressure difference across the IAT 265, the target pressure difference across the IAT 270, the pressure difference error value 275, and/or the target ECR 280. The example HDM 215 interprets parameters in response to input(s) 205 and/or other parameters available to the controller 42. In one example, the HDM 215 interprets the engine load 235 as an actual engine load in response to input 205 from the EMP sensor 50. In another example, the HDM 215 interprets the engine speed error value 245 in response to a comparison of the engine speed 230 (e.g., from the input 205 from the engine speed sensor 54) and the target engine speed 240 (e.g., a received, stored, or determined value). In some embodiments, to perform the functions described herein throughout, the HDM 215 may include one or more of an analog to digital converter (ADC), a processor, a non-transient computer readable storage medium, a bus, wired/wireless connection hardware, and/or one or more of the sensors 44, 46, 48, 50, 52, 54, and 56 (FIG. 1). In other embodiments, one or more of these may be excluded from the HDM 215.

The example AHDM 220 determines one or more parameters for control of the air handling system 16 (FIG. 1), such as the IAT position 255 and the intake valve timing value 257. In some embodiments, the intake valve timing value 257 includes a cam phaser position 260 (e.g., in a VVT system). In various embodiments, the intake valve timing value 257 includes an intake valve open duration 262 (e.g., in a VVA system). These air handling control parameters are determined in response to one or more engine parameters available to the controller 42. For example, the IAT position 255 and/or the intake valve timing value 257 may be determined in response to the engine speed 230 and/or the engine load 235. In a further example, the IAT position 255 may be determined in response to the target engine speed 240 and/or the engine speed error value 245. In yet another example, the intake valve timing value 257 may be determined in response to the target engine speed 240, the engine speed error value 245, the target pressure difference across the IAT 270, the pressure difference error value 275, and/or the target ECR 280. In some embodiments, to perform the functions described herein throughout, the AHDM 220 may include one or more of a processor, a non-transient computer readable storage medium, a bus, and/or wired/wireless connection hardware. In other embodiments, one or more of these may be excluded from the AHDM 220.

The example HCM 225 provides one or more commands for component(s) of the engine system 10 in response to one or more control signals, such as an IAT position command and an intake valve timing command (e.g., cam phaser position command). In some embodiments, to perform the functions described herein throughout, the HCM 225 may include, but is not limited to, the IAT 28, the cam phaser 40, a processor, a non-transient computer readable storage medium, a bus, and/or wired/wireless connection hardware.

In other embodiments, one or more of these may be excluded from the HCM 225.

Figure 3:
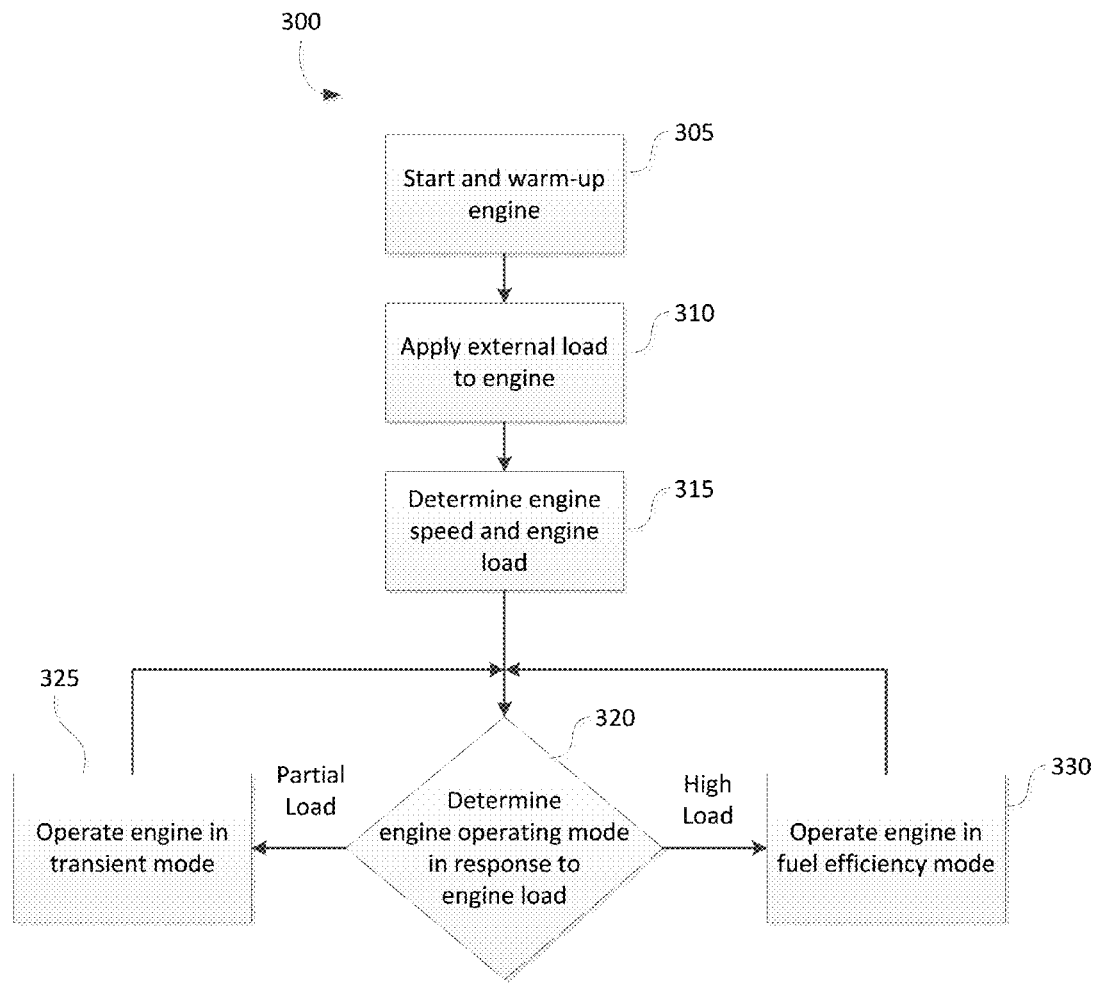
FIG. 3 is a flowchart diagram of an example procedure of operating an engine system, according to some embodiments.

FIG. 3 is a flowchart diagram of an example procedure 300 of operating an engine system, such as engine system 10, according to some embodiments. In operation 305, an internal combustion engine is started and warmed-up to a target engine speed (e.g., an idle engine speed). The target engine speed may be fixed in some applications, such as for stationary power generation. The internal combustion engine may setup to run at stoichiometric combustion (e.g., for a natural gas engine).

In operation 310, an external load is applied to the internal combustion engine. The external load may be a generator, for example, in a power generation application that produces electrical power. Some external loads are capable of varying the load applied to the internal combustion engine in a range from 0% to 100% of the rated load of the engine system, such as from 20% to about 100%.

In operation 315, an engine speed and an engine load of the engine system are determined. The engine speed may be determined in response to a measurement from an engine speed sensor. The engine load may be an actual engine load or a predicted engine load, such as a predicted torque demand or a desired engine load.

In operation 320, an engine operating mode is determined in response to the engine load. In the illustrated embodiment, the engine load may be classified or categorized as a partial load or a high load. The partial load condition may be defined by a range or a threshold. The high load condition may be defined by a range or a threshold above the partial load range and may include the rated load of the engine system. The determined engine operating mode may be a transient mode and/or a fuel efficiency mode.

Operation 325 is performed when a transient engine operating mode is determined in response to a partial load condition. In operation 325, the engine system is operated in a transient mode. In a power generation application, a partial load condition may indicate that the engine load will be increasing every few seconds toward a higher engine load, such as the rated engine load. The engine system may benefit from a higher volumetric efficiency for a faster load pickup. An example procedure 400 for carrying out operation 325 is shown in more detail in FIG. 4.

Operation 330 is performed when a fuel efficiency engine operating mode is determined in response to a high load condition. In operation 330, the engine system is operated in a fuel efficiency mode. In a power generation application, a high load condition may indicate that the engine load will not be changing quickly and/or that the engine system is near a nominal or steady state operating condition. The engine system may benefit from a higher open cycle efficiency and lower pumping loss. Example procedures 500, 600 for carrying out operation 330 are shown in more detail in FIGS. 5 and 6.

Figure 4:
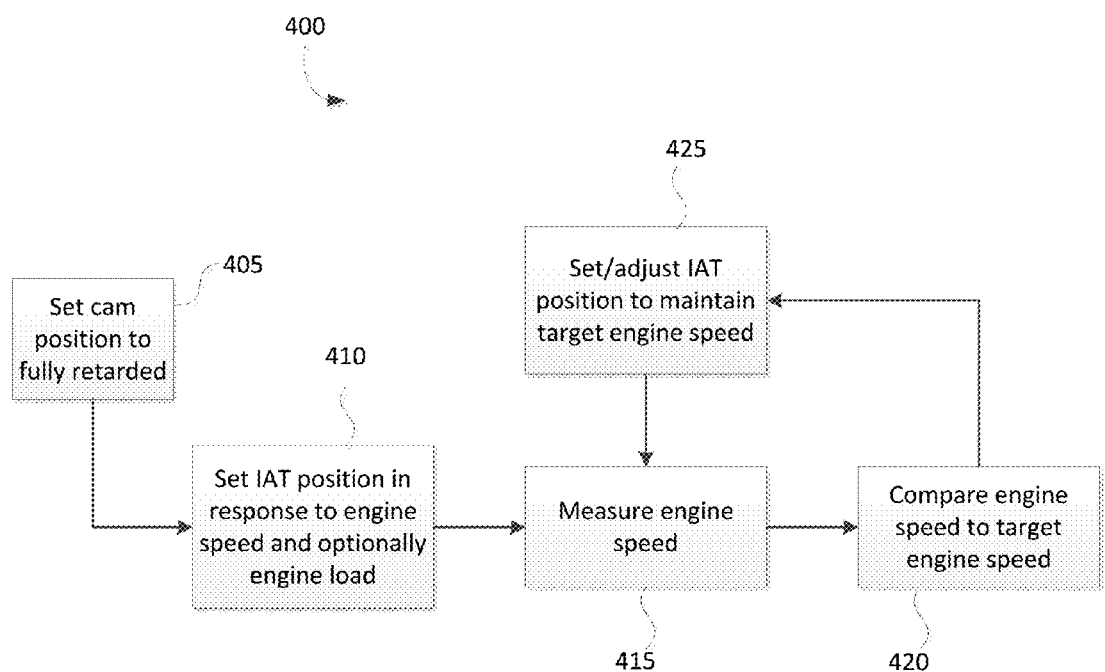
FIG. 4 is a flowchart diagram of an example procedure for operating an engine system in a transient mode, according to some embodiments.

FIG. 4 is a flowchart diagram of an example procedure 400 for operating an engine system in a transient mode, according to some embodiments. In operation 405, the cam phaser is set into a full retard position. In various embodiments, the full retard position corresponds to the highest ECR position and/or a highest volumetric efficiency position for the cam phaser.

In operation 410, the IAT is placed into an initial position (e.g., base position) in response to the engine speed and optionally the engine load. The initial position of the IAT, in conjunction with the fully retarded cam phaser position, sets the amount of charge air flow being delivered to the cylinders, and thus controls the engine speed. In some embodiments, the initial IAT position is less open than a nominal IAT position. In various embodiments, the charge air flow corresponding to the initial IAT position and the fully retarded cam phaser position is about equal to the charge air flow corresponding to the nominal IAT position and the nominal cam phaser position. Operation 410 may be considered a feed-forward control operation.

In the illustrated embodiment, the procedure 400 proceeds into a feedback control operation or control loop after the engine speed and/or engine load have stabilized, in which each iteration measures engine speed and sets the IAT position to a feedback IAT position. In operation 415, the engine speed is measured. In operation 420, the engine speed is compared with the target engine speed, which may be fixed for a power generation application. An engine speed error value may be determined in response to the comparison. In operation 425, the IAT position is set or adjusted in response to the comparison or the error value to maintain the target engine speed.

In some embodiments, a feedback IAT position is determined in response to the engine speed error value to reduce the error and maintain the engine speed in response to engine load disturbances. For example, when the applied engine load increases during load pickup, the engine speed is temporarily slowed below the target engine speed. Because engine speed is monitored, in response to a slowed engine speed, the IAT position is adjusted to a more open position to increase the charge air flow, which returns the engine speed to the target engine speed. This feedback control loop may continue to iterate until the engine system is operated in another mode. In this manner, procedure 400 facilitates responding to increasing applied load while improving volumetric efficiency and/or ECR.

Figure 5:
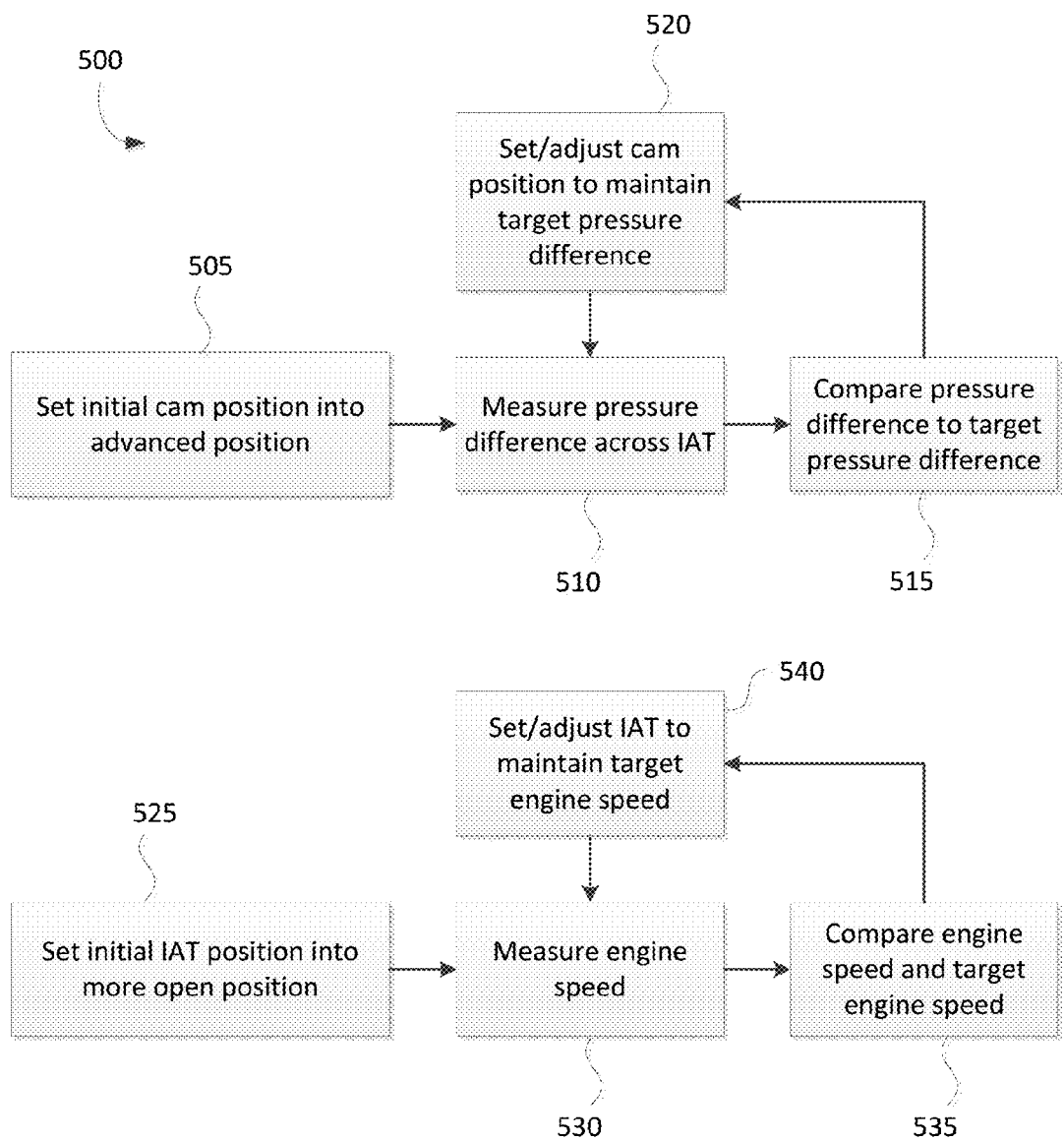
FIG. 5 is a flowchart diagram of example procedure for operating an engine system in a fuel efficiency mode, according to some embodiments.

FIG. 5 is a flowchart diagram of an example procedure 500 for operating an engine system in a fuel efficiency mode, according to some embodiments. As illustrated, the procedure 500 includes two control paths. The first control path begins with operation 505, in which the cam phaser is set into an initial position (e.g., base position) in response to the engine load. In various embodiments, the initial cam phaser position is set to an advanced position in the advanced range in response to an engine load at or above 50%. In alternative embodiments, the initial cam phaser position is set to an advanced position in response to an engine load at or above 80%, or at an engine load between 50% and 80%. In some embodiments, the initial cam phaser position is fully advanced at an engine load of about 100%.

The initial cam phaser position may be set further in response to the engine speed for some applications, for example, in which the target engine speed is not fixed. Operation 505 may be considered a feed-forward control operation.

In various embodiments, the first control path for example procedure 500 proceeds into a feedback control operation or control loop after the engine speed and/or engine load have stabilized, in which each iteration measures a pressure difference and sets the cam phaser position to a feedback cam phaser position. In operation 510, the pressure difference across the IAT is measured. In operation 515, the pressure difference across the IAT is compared with a target pressure difference across the IAT. A pressure difference error value may be determined in response to the comparison. In operation 520, the cam phaser position is set or adjusted in response to the comparison or the error value to maintain the target pressure difference across the IAT.

In some embodiments, the target pressure difference across the IAT is selected to provide a balance between a desired amount of control over charge air flow and/or to reduce pumping loss. For example, as the IAT position becomes more wide open in response to higher engine speed, the pressure difference across the IAT temporarily decreases. Because the pressure difference is monitored to reduce the pressure difference error value, the current cam phaser position is adjusted to a more retarded position to decrease the pressure downstream of the IAT, which returns the pressure difference to the target pressure difference. This feedback control loop in the first control path may continue to iterate until the engine system is operated in another mode. Because the first control path involves setting the cam phaser, which is a slower actuator than the IAT, this control loop may be referred to as the "slow control loop."

The second control path for example procedure 500 begins with operation 525, in which the IAT position is set to an initial position (e.g., base position) in response to the engine speed and optionally the engine load. In some embodiments, the IAT position is set more open than a nominal IAT position. In various embodiments, the charge air flow corresponding to the initial IAT position and the initial cam phaser position (which is set in response to the engine load in operation 505) is about equal to the charge air flow corresponding to the nominal IAT position and the nominal cam phaser position. Operation 525 may be considered a feed-forward control operation.

In various embodiments, the second control path proceeds into a feedback control operation or control loop after the engine speed and/or engine load have stabilized, in which each iteration measures an engine speed and sets the IAT position to a feedback IAT position. In operation 530, the engine speed is measured. In operation 535, the engine speed is compared with a target engine speed. An engine speed error value may be determined in response to the comparison. In operation 540, the IAT position is set or adjusted in response to the comparison or the error value to maintain the target engine speed.

In some cases, maintaining the engine speed at the target engine speed is an important requirement. Because the IAT is a faster actuator than the cam phaser, the IAT position is suited for quickly reacting to disturbances in engine speed and adjusting the charge air flow. As previously mentioned, the ability for the IAT position to influence charge air flow is also influenced by the pressure difference across the IAT, which is set in the first control path by the cam phaser (operation 520). Because the second control path involves setting the IAT, this control loop may be referred to as the "fast control loop."

In this manner, the first and second control paths of procedure 500 facilitates quickly responding to engine speed disturbances while reducing pumping loss to improve open cycle efficiency, and thus brake thermal efficiency.

Figure 6:
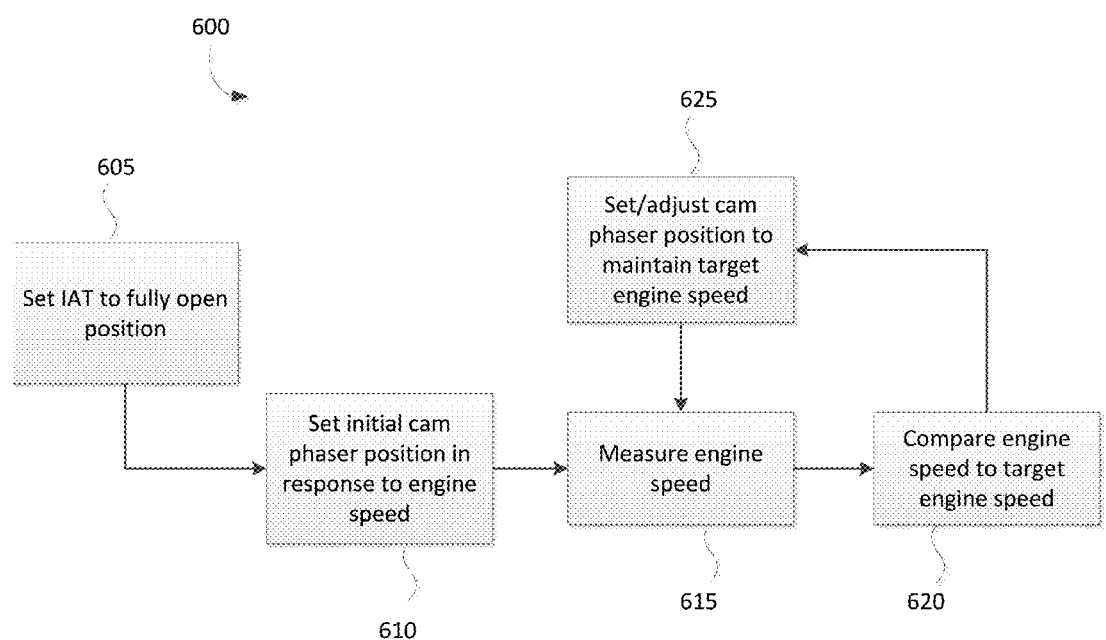
FIG. 6 is a flowchart diagram of an example procedure for operating an engine system in another fuel efficiency mode, according to some embodiments.

FIG. 6 is a flowchart diagram of an example procedure 600 for operating an engine system in a fuel efficiency mode, according to some embodiments. Example procedure 600 may be a subprocedure of procedure 500 or an alternative procedure replacing procedure 500. For example, procedure 600 may be utilized in procedure 500 only when the IAT is at full throttle.

In operation 605, the IAT is set to a full throttle position. The full throttle positon corresponds to the lowest pressure difference across the IAT, and the full throttle position also corresponds to a highest charge air flow position, a highest open cycle efficiency position, a lowest pumping loss position, and a highest brake thermal efficiency position for the IAT. In some embodiments, IAT may additionally or alternatively be set in response to the engine speed being at or near the target engine speed.

In operation 610, the cam phaser is set into an initial position (e.g., base position) in response to the engine speed and optionally the engine load. The initial position of the cam phaser, in conjunction with the fully open IAT, sets the amount of charge air flow being delivered to the cylinders, and thus controls the engine speed. Operation 610 may be considered a feed-forward control operation.

In various embodiments, the procedure 600 proceeds into a feedback control operation or control loop after the engine speed and/or engine load has stabilized, in which each iteration measures engine speed and sets the cam phaser position to a feedback cam phaser position. In operation 615, the engine speed is measured. In operation 620, the engine speed is compared with the target engine speed, which may be fixed for a power generation application. An engine speed error value may be determined in response to the comparison. In operation 625, the cam phaser position is set or adjusted in response to the comparison or error value to maintain the target engine speed.

In some embodiments, the cam phaser position is determined in response to the engine speed error value to reduce the error and maintain the engine speed in response to engine load disturbances. For example, in a response to a temporarily reduced load (e.g., from 100% to 90%), the engine speed may increase above the target engine speed. Because engine speed is monitored, in response to the faster engine speed, the cam phaser position is adjusted to a more advanced position to reduce the charge air flow, which returns the engine speed to the target engine speed. This feedback control loop may iterate until the engine system is operated in another mode. In this manner, procedure 600 facilitates responding to engine speed disturbances while improving open cycle efficiency, pumping loss, and/or brake thermal efficiency.

Figure 7:
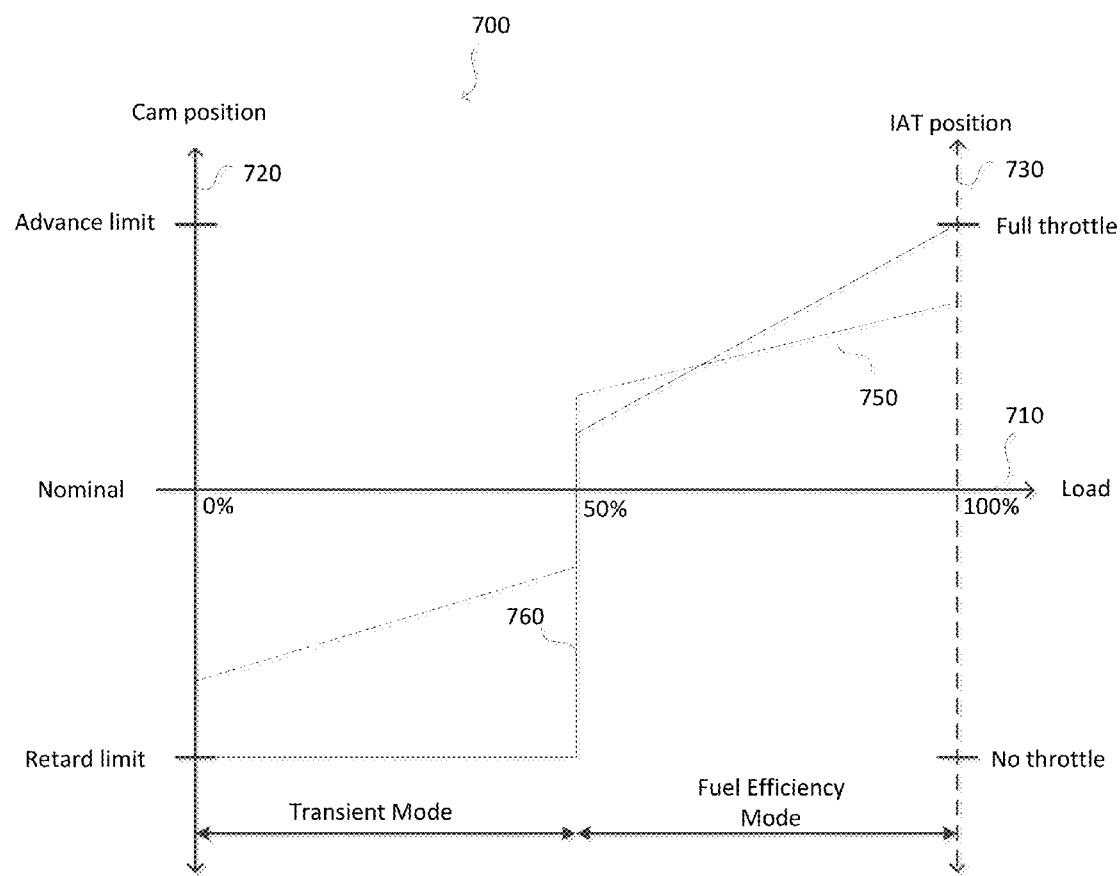
FIGS. 7, 8, and 9 are illustrations of example plots and showing the position of an IAT and a cam phaser during operation of an engine system, according to some embodiments.
Figure 8:
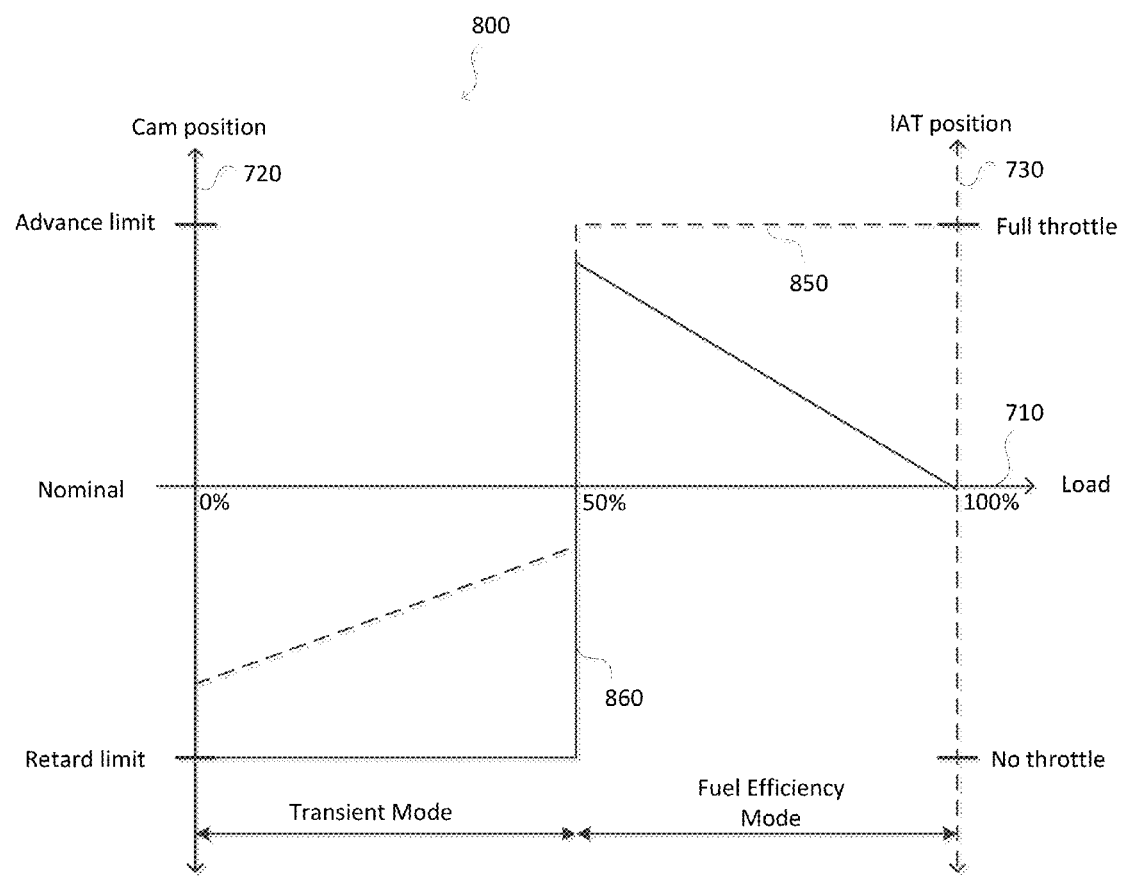
Figure 9:
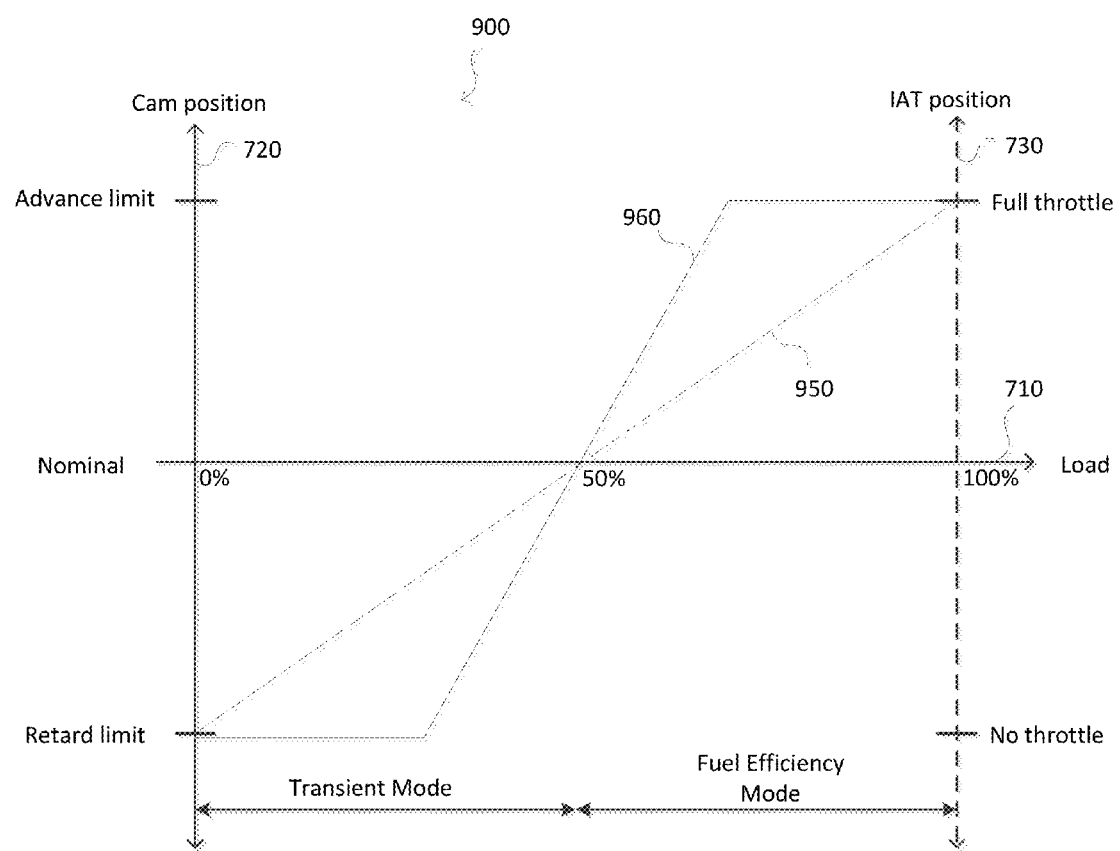

FIGS. 7, 8, and 9 are illustrations of example plots 700, 800, and 900 showing the position of an IAT and a cam phaser during operation of an engine system, according to some embodiments. The example plots 700, 800, 900 each include an engine load axis 710 (e.g., an X-axis), a cam phaser position axis 720 (e.g., a first Y-axis), and an IAT position axis 730 (e.g., a second Y-axis).

Along the cam phaser position axis 720, an advance limit and a retard limit are shown. In various embodiments, the advance limit corresponds to the earliest timing the intake valves open and close allowed by the cam phaser, while the retard limit corresponds to the latest timing the intake valves open and close allowed by the cam phaser. The nominal cam phaser position is between the advance limit and the retard limit.

Along the IAT position axis 730, a full throttle position and a no throttle position are shown. The full throttle position corresponds to the lowest pressure difference across the IAT, while the no throttle limit corresponds to the greatest pressure difference across the IAT. The nominal IAT position is between no throttle and full throttle.

Also shown is an example transient mode, which corresponds to an engine load range between 0% and 50% of the rated load of the engine system. FIGS. 7, 8 and 9 show the engine system operating in a transient mode similar to example procedure 400 (FIG. 4). An example fuel efficiency mode corresponds to an engine load range above 50% of the rated load to the rated load (e.g., 100%) of the engine system. FIG. 7 shows the engine system operating in a fuel efficiency mode similar to example procedure 500 (FIG. 5).

FIG. 8 shows the engine system operating in a fuel efficiency mode similar to example procedure 600 (FIG. 6). That is, the engine system switches between transient mode and fuel efficiency mode at about 50% of rated load. FIG. 9 shows the engine system operating with gradual transitions between the transient mode and the fuel efficiency mode, according to either example procedure 500 (FIG. 5) or example procedure 600 (FIG. 6).

For illustrative purposes, the example plots 700, 800, and 900 correspond to operating an engine system having a fixed target engine speed. Furthermore, plots 700, 800, and 900 are illustrative only and do not represent actual test data.

In addition, for illustrative purposes, the example plots 700 and 800 show sharp changes in IAT position and cam phaser position when transitioning between modes to clearly show the change in behavior between modes. In some embodiments, the IAT and cam phaser positions are adjusted gradually when transitioning between modes by changing the respective feedback target (e.g., without a setting an initial position) from the transitory mode target to the fuel efficiency mode target, for example. An example of a gradual change is shown in example plot 900 (FIG. 9).

As illustrated in FIG. 7, the example plot 700 shows the IAT position 750 and the cam phaser position 760 as the engine load increases from 0% to 100% of the rated load. As shown, the IAT position 750 begins at a position corresponding to an idle engine at 0% of rated load. As the load increases in the transient mode range from 0% to 50%, the IAT position 750 becomes more open to provide more charge air flow to maintain the engine speed at increased load.

In the illustrated embodiment, in the transient mode range from 0% to 50%, the cam phaser position 760 is at the full retard position. Accordingly, as shown, the IAT position 750 in the transient mode range may be less open than the nominal IAT position.

After the engine load surpasses 50% of rated load and enters into the fuel efficiency mode range, the cam phaser position 760 transitions to the advanced range (e.g., more advanced than nominal) to open the intake valves earlier and maintain a pressure difference across the IAT. In a cooperative manner, the IAT position 750 also transitions to be more open to adjust for the lower volumetric efficiency due to the earlier opening and closing of the intake valves. As the engine load increases in the fuel efficiency mode range, the cam phaser position 760 advances and reaches the advance limit as the engine load approaches 100% of rated load, in order to allow the IAT to be more open to reduce pumping losses due to the pressure difference across the IAT (e.g., improve open cycle efficiency) and to improve the influence of changes in the IAT position over the charge air flow. In the illustrated embodiment, the IAT position 750 increases with engine load but does not approach full throttle by design in order to give the IAT the ability to compensate for load disturbances that would affect the engine speed. In this manner, the IAT position 750 and the cam phaser position 760 cooperate to improve load pickup performance and maintain engine speed at high load, while improving brake thermal efficiency.

As illustrated in FIG. 8, the example plot 800 shows the IAT position 850 and the cam phaser position 860. As shown, in the transient mode range, the IAT position 850 and cam phaser position 860 are similar to IAT position 750 and cam phaser position 760. After the engine load passes 50% of rated load and enters into a fuel efficiency mode range, however, the IAT position 850 transitions to a full throttle position in order to minimize the pumping losses due to the pressure difference across the IAT (e.g., improve open cycle efficiency) and to increase the charge air flow. In a cooperative manner, the cam phaser position 860 transitions into an advanced range, which reduces the volumetric efficiency due to opening the intake valves earlier, which adjusts for the greater charge air flow. As the engine load increases in the fuel efficiency mode range, the cam phaser position 860 retards toward the nominal position at 100% of rated load by design in order to give the cam phaser the ability to adjust the charge air flow in response to load disturbances that would affect the engine speed. In this manner, the IAT position 850 and the cam phaser position 860 cooperate to improve load pickup performance and maintain engine speed at high load, while improving brake thermal efficiency.

As illustrated in FIG. 9, the example plot 900 shows the IAT position 950 and the cam phaser position 960. As shown, in the transient mode range and the fuel efficiency mode range, the IAT position 950 increases gradually toward full throttle. This gradual transition in the IAT position 950 corresponds to a similarly gradual increase in engine speed toward the fixed, target engine speed for rated load operation. The cam phaser position 960 remains at a full retard position through at least a portion of the transient mode range—as shown, from 0 to 30% of rated load. From greater than 30% to 50% in the transient mode range, the cam phaser position 960 advances gradually.

At about greater than 50% of rated load, in the fuel efficiency mode, the IAT position 950 continues to gradually increase toward full throttle. The transition between the transient mode and the fuel efficiency mode for the IAT position 950 is gradual. The cam phaser position 960 continues to gradually increase for at least a portion of the fuel efficiency mode range, and also transitions gradually between modes. The cam phaser position 960 reaches an advance limit prior to rated load. As shown, the cam phaser position 960 reaches the advance limit at about 70% of rated load and stays in the fully advanced position from greater than 70% to 100% of rated load.

In the fuel efficiency mode, or once at rated load, the engine system may be operated at rated load according to either example procedure 500 (FIG. 5) or example procedure 600 (FIG. 6), for example.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in association with another embodiment. The scope of the invention should, therefore, be determined with reference to the appended claims, along with the full scope of equivalents to which such claims are entitled.

The following is claimed:

1. A method of air handling for an engine system with premixed air and fuel upstream of at least one engine cylinder, comprising:
   determining an engine speed and an engine load of the engine system, wherein the engine load is one of an actual engine load and a predicted engine load;
   setting an intake air throttle (TAT) position in response to the engine speed; and
   setting an intake valve timing in response to a pressure difference error value across the IAT and the engine speed.

2. The method of claim 1, further comprising running the engine system with a fuel including at least one of natural gas and gasoline, the fuel being premixed with air upstream of the at least one engine cylinder at one of a stoichiometric or a lean burn ratio.

3. The method of claim 1, wherein setting the intake valve timing includes setting at least one of a cam phaser position or an intake valve open duration.

4. The method of claim 1, wherein the IAT position is set to a feedback IAT position in response to an engine speed error value to maintain a target speed.

5. The method of claim 1, further comprising receiving a load signal from an external load driven by the engine system and determining the engine load based on the load signal.

6. The method of claim 5, wherein the external load comprises a power generator and the load signal is based on an electrical power of the power generator.

7. The method of claim 1, further comprising determining an engine operating mode for the engine system in response to the engine load, wherein the engine operating mode is one of a transient mode or a fuel efficiency mode.

8. The method of claim 7, wherein the transient engine operating mode is determined in response to a partial engine load, and wherein the intake valve timing is set to improve a transient response time.

9. The method of claim 8, wherein the IAT position is set to an initial position in response to the engine speed and the engine load.

10. The method of claim 9, wherein the IAT position is set to a feedback position in response to an engine speed error value to maintain a target engine speed.

11. The method of claim 7, wherein the fuel efficiency mode is determined in response to a higher engine load than a partial engine load range, wherein the IAT position is set to an initial IAT position in response to the engine speed and the engine load.

12. The method of claim 11, wherein the intake valve timing is set to an initial intake valve timing in response to at least one of: the engine load, a pressure difference across the IAT, or an effective compression ratio (ECR).

13. The method of claim 11, wherein the initial IAT position is a full throttle position, the intake valve timing is set to an initial intake valve timing in response to the engine speed; and the intake valve timing is set to a feedback intake valve timing in response to an engine speed error value to maintain a target speed.

* * * * *